Patented June 4, 1940

2,203,144

UNITED STATES PATENT OFFICE 2,203,144

DRYING AGENT AND PROCESS OF MAKING AND USING THE SAME

William A. Hammond, Yellow Springs, Ohio

No Drawing. Application March 9, 1937, Serial No. 129,917

11 Claims. (Cl. 252—2.5)

This invention relates to drying or desiccating agents and the process of making and using the same, and has for its primary object to provide a material having suitable physical and chemical properties to render it an efficient agent for the removal of water from other materials, and to employ the material in a manner to utilize its special characteristics. It relates specifically to improvements in the drying agent covered by my United States Patent No. 1,887,349, issued November 8, 1932, and to the processes involved in making and utilizing said improvement in the product.

Further objects and advantages will become apparent as the description proceeds.

The drying agent covered by the above patent consists of a form of anhydrous calcium sulphate produced and having the properties and advantages as described in that patent.

Among these properties and advantages are its efficiency as a drying agent, that is, the completeness with which it will extract water from materials exposed thereto, its retention of its original form, size and apparent condition regardless of the amount of its water content, and the ease with which it may be regenerated. However, it does not have a large water absorbing capacity. Its high efficiency persists only to absorb about 6.6% of its weight of water, to form the half-hydrate, $CaSO_4.\frac{1}{2}H_2O$, although the highly porous nature of the material enables it to absorb some additional water, around 2% to 5%, depending on temperature, pressure, etc.

Calcium chloride is a well known drying agent. It has a large water absorbing capacity, but its use has been restricted by its relatively low drying efficiency and the practical difficulties in use, handling and regeneration caused by its deliquescent character, and its chemical activity affecting containers and also affecting many materials which might be dried by it if it had not such chemical activity.

The present invention has for its object to combine anhydrous calcium sulphate and calcium chloride and produce a drying agent which, by proper use, will retain the high drying efficiency of anhydrous calcium sulphate while having its water absorbing capacity greatly increased.

When the sulphate has the chloride combined therewith, the anhydrous sulphate exercises its high drying efficiency until it becomes the half hydrate. Thereafter the calcium chloride continues to absorb water, and as it becomes deliquescent and brings liquid water into contact with the half-hydrate sulphate, this liquid water is absorbed by the sulphate to form dihydrate. Thus the combined material has a water absorbing capacity equal to that of the anhydrous sulphate present plus that of the calcium chloride present plus that necessary to change the sulphate from the half hydrate to the dihydrate form.

When the proportion of chloride to sulphate is properly limited, the combined drying agent may absorb water to nearly its full capacity and still retain its granular form. If more than about 15% of the combined anhydrous mass is calcium chloride, its deliquescence may impart a noticeable and objectionable wet characteristic to the material. Any small amount of the calcium chloride increases the water absorbing capacity of the sulphate, and for some purposes 15% or even more may be used, although it does result in an appearance of wetness when sufficiently exposed to moisture, but in order to increase the capacity of the material without any danger of the material becoming sensibly moist, from 9% to 12% of the calcium chloride is preferred.

When moist air or other moisture bearing gas is passed through a column of the improved drying material, it is dried effectively by the first material it contacts. As the supply of moist gas is continued, the calcium sulphate in the material first contacted becomes half hydrated. Thereafter, the gas is partially dried by the absorptive action of the calcium chloride in the material first contacted, and this partly dried gas is further dried by the anhydrous sulphate in the layer next contacted. After the water absorbing capacity of the first contacted layer is exhausted, the gas passes through that layer without change, is partly dried by the next layer and the drying is completed by the first contacted layer that still retains calcium sulphate in the anhydrous condition. In this way the column of material continues to constitute a fully efficient drying means until the last-contacted layer has the sulphate therein half-hydrated, by which time the greater portion of the column has absorbed water to its full capacity.

The material composed of anhydrous calcium sulphate, in accordance with the patent cited above, in combination with calcium chloride may be formed in any suitable way. One way is to prepare the anhydrous sulphate in the manner taught by the patent cited above and then to impregnate this material with an aqueous solution of calcium chloride, and finally to heat the mass to drive off the water. Heating the material for about two hours at about 225° C. to 250° C., as described in the above cited patent, renders anhydrous the calcium chloride as well as the calcium sulphate, and leaves the chloride uniformly distributed throughout the porous structure of the sulphate. As pointed out in the patent, the heating should not be about 300° C. if the best drying efficiency of the material is to be retained.

Another method is to mix the calcium chloride solution with either anhydrous or half-hydrate calcium sulphate to form a plastic mass which may then be formed in any suitable manner into desired shapes and then allowed to set or harden. It may be hardened in granules of the desired size or shape, or it may be hardened in larger masses and then broken to desired size.

As one example, 89 grams of the anhydrous sulphate, or an equivalent amount of the half hydrate, may be thoroughly mixed with 33 cubic centimeters of an aqueous solution of calcium chloride of a density to contain 11 grams of anhydrous calcium chloride. After these ingredients have been thoroughly mixed, sufficient water is added to make a plastic mass of the desired consistency. Thirty to forty cubic centimeters of water is sufficient to effect this. This plastic mass may be formed and hardened, as described above. The hardening process may be accelerated by adding 0.2% to 0.5% finely powdered calcium sulphate dihydrate and/or powdered potassium sulphate.

Calcium chloride is the preferred material to use in conjunction with calcium sulphate for drying gases because it operates satisfactorily, is readily rendered anhydrous by the heating operation which is most advantageous for rendering the calcium sulphate anhydrous, and is readily available. However, other deliquescent compounds, that can be regenerated by the heating appropriate for regenerating the calcium sulphate, may be used instead of calcium chloride. Among deliquescent salts that are stable at the temperature required for regenerating the calcium sulphate, the chlorides of magnesium, nickel and cobalt may be mentioned, but others having like properties may be used. These various deliquescent materials may be used either alone or in compatible mixtures.

The material may be used as a drying agent in various well known ways; but the best way in which I have used it is to provide a column thereof, pass gas to be dried through the column of material until the calcium sulphate in the last of the material to be contacted is half hydrated, and then regenerate the material. In this way the full absorptive power of all but the final layer may be utilized while maintaining the high drying efficiency of the anhydrous calcium sulphate.

The preferred method of compounding and using the improved drying agent has been disclosed in considerable detail, but it will be understood that various changes may be made in accordance with the principles stated above, and within the scope of the appended claims.

What I claim is:

1. A drying agent comprising an intimate mixture of anhydrous calcium sulphate and an anhydrous, deliquescent material.

2. A drying agent consisting essentially of anhydrous calcium sulphate and anhydrous calcium chloride.

3. A drying agent consisting essentially of porous granules of anhydrous calcium sulphate impregnated with a deliquescent material.

4. A drying agent for use in a column for drying gas or vapor, consisting essentially of porous granules of anhydrous calcium sulphate impregnated with a deliquescent material in sufficient quantity to supply liquid water to the sulphate during use of the material as a drying agent, but in insufficient proportion to run from the pores of the granules because of deliquescence.

5. A drying agent consisting essentially of porous granules of anhydrous sulphate impregnated with not over 15% by weight of anhydrous calcium chloride.

6. A drying agent consisting essentially of porous granules of anhydrous calcium sulphate impregnated with between 8% and 12% anhydrous calcium chloride.

7. The method of forming a drying agent which consists in forming an intimate mixture of calcium sulphate and a deliquescent material and heating the mixture at a temperature not over 300° C. until it is anhydrous.

8. The method of forming a drying agent which consists in mixing calcium sulphate with an aqueous solution of a deliquescent material and heating the mixture at a temperature not over 300° C. until anhydrous.

9. The method of forming a drying agent which consists in impregnating porous granules of calcium sulphate with a solution of calcium chloride and heating the impregnated granules at a temperature of not over 300° C. until anhydrous.

10. The method of forming a drying agent, which consists in mixing calcium sulphate half hydrate with a solution of calcium chloride to form a plastic mass, forming the mass into hardened granules, and heating the granules at a temperature of not over 300° C. until anhydrous.

11. The method of drying gas which consists in passing the gas through a column of anhydrous calcium sulphate and a deliquescent material always in the same direction, stopping the flow of gas not later than when the sulphate in the last layer to be contacted by the gas is half-hydrated, then driving off the absorbed water by heating the material in the column to a temperature of not over 300° C. and repeating the operation.

WILLIAM A. HAMMOND.